United States Patent [19]

Givant

[11] Patent Number: 5,516,208
[45] Date of Patent: May 14, 1996

[54] ADJUSTABLE POT STIRRER

[76] Inventor: Madeline F. Givant, 6442 Wilkinson Ave., North Hollywood, Calif. 91606

[21] Appl. No.: 410,664

[22] Filed: Mar. 27, 1995

[51] Int. Cl.⁶ .................................................. B01F 7/18
[52] U.S. Cl. ............................................ 366/251; 99/348
[58] Field of Search ................................. 366/245, 246, 366/247, 248, 249, 250, 251, 252, 253, 254, 60, 65, 66, 279; 99/348

[56] References Cited

U.S. PATENT DOCUMENTS

| | | | |
|---|---|---|---|
| 2,700,534 | 1/1955 | Pegoes | 366/251 |
| 3,357,685 | 12/1967 | Stephens | 99/348 |
| 3,697,053 | 10/1972 | Will | 99/348 |
| 3,810,605 | 5/1974 | Lambert | 99/348 |
| 4,832,501 | 5/1989 | McCauley | 366/279 |

*Primary Examiner*—Robert W. Jenkins
*Attorney, Agent, or Firm*—Allan M. Shapiro

[57] ABSTRACT

A stirrer is disclosed herein for mixing ingredients in a pot wherein the stirrer includes a housing enclosing a battery-operated motor driving a downwardly depending drive shaft to which a stir paddle is detachably connected via an offset link so that the paddle revolves about the central axis of the housing but offset therefrom. A releasable mounting arrangement attaches the housing to the rim of the pot so that the drive shaft is centered thereon allowing the paddle to revolve without striking the wall of the pot. The mounting arrangement includes self-adjusting, spring-bias arms having end clamps detachably coupled with the pot rim. Push button and dial controls with circuit networks carried on the housing selectively control time, speed and other operating parameters.

12 Claims, 2 Drawing Sheets

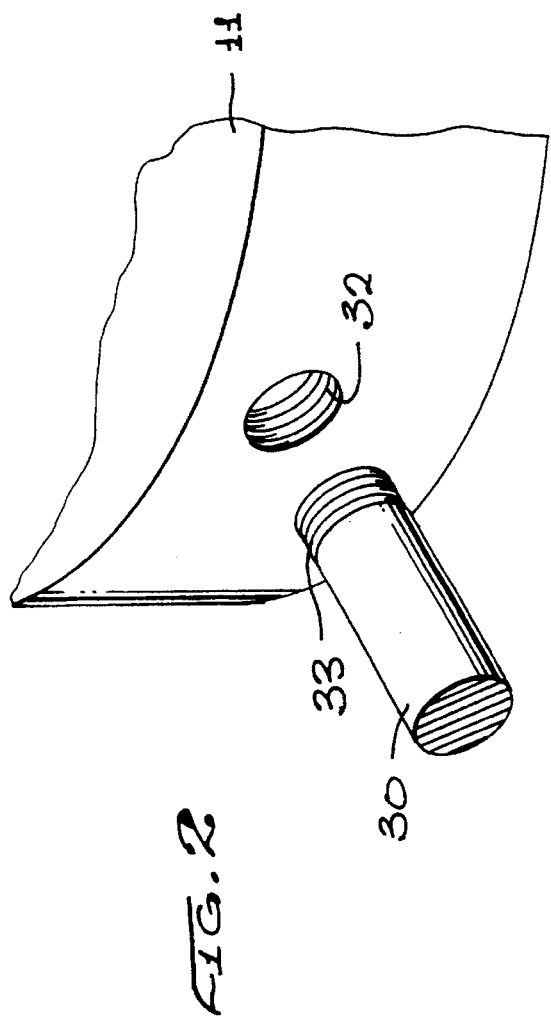
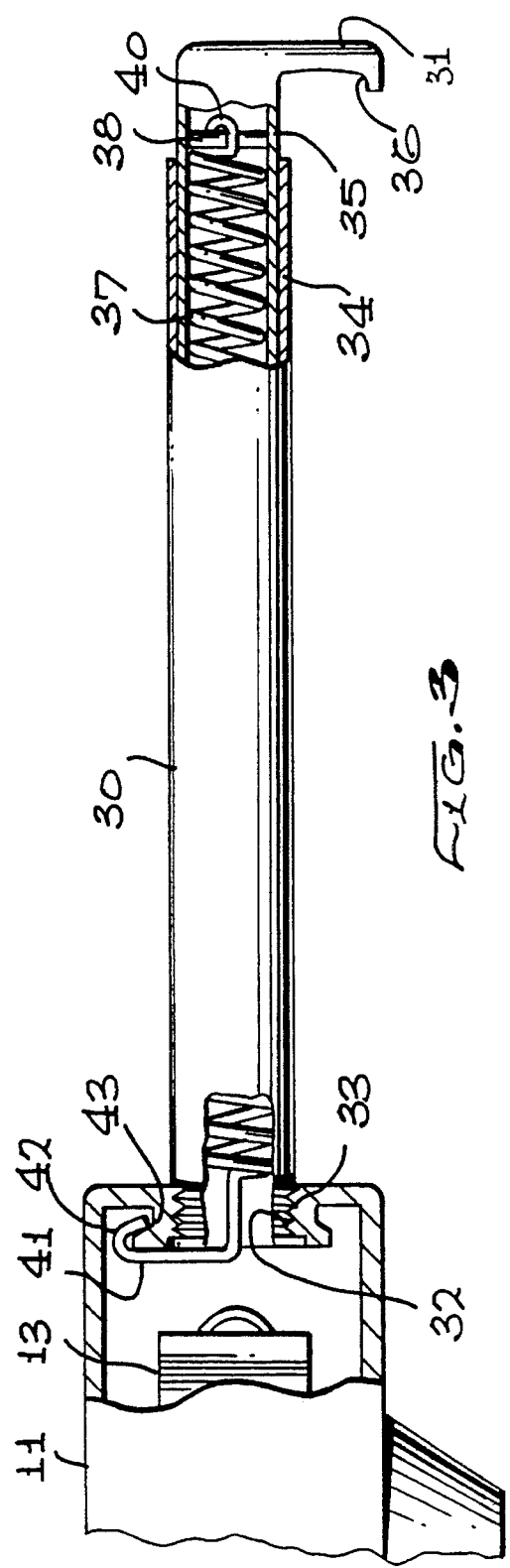

ADJUSTABLE POT STIRRER

BACKGROUND OF THE INVENTION

The present invention relates to the field of culinary appliances and more particularly to a novel device for stirring the ingredients contained in a pot whereby the stir paddle is offset from the central rotating axis and which includes adjustable arms for mounting the device onto the rim of the pot.

BRIEF DESCRIPTION OF THE PRIOR ART

In the past, it has been the conventional practice to employ spoons, paddles and other implements for stirring ingredients in a pot wherein the implements are manually manipulated by the user. Such action is tiresome over a period of time and, in most instances, the user will stir for awhile and then remove the implement from the pot by resting the implement on a dish or the like. Subsequently, the user will grasp the implement again and place it into the pot to continue the stirring procedure. In other instances, the user may use a motorized apparatus for beating or rapidly mixing the ingredients. Such a device operates at high speeds and it may use a variety of beaters such as split shafts, segmented paddles or the like. In these instances, the path of rotation is at the discretion of the user and does not follow a fixed or precise path, thus allowing the user to inadvertently engage the beaters with the side of the pan which causes damage to the beaters and the pan and may contaminate the ingredients. Although timing devices have been used with the previously described beater type mixers, no settings are employed for temperature control and for controlling other operating parameters.

Therefore, a longstanding need has existed to provide a novel stirring device which may be adjustably carried on a variety of different sized pots and whereby the paddle rotation follows a variety of predescribed paths about and offsets from a central rotating axis.

SUMMARY OF THE INVENTION

Accordingly, the above problems and difficulties are avoided by the present invention which provides a novel stirring device having a housing which supports a motor and a battery operably connected to the motor via control circuits coupled to pushbutton and dial controls exterior of the housing. The motor includes a downwardly depending drive shaft and a stir paddle is detachably connected to the end of the drive shaft by means of a link disposed normal to the axis of rotation of the drive shaft so that the paddle follows a path offset from the axis of rotation of the drive shaft. Preferably, the stir paddle is connected to the offset link by detachable means and the offset link is attached to the drive shaft by a snap lock detachable means so that different types and sizes of paddles and links can be used to accommodate different sizes of pots and a variety of ingredients. The housing is adjustably attached to the rim of a pot by means of outwardly projecting arms which are equally spaced about the housing and which include a telescoping means under spring bias for adjusting the distance between the housing and the rim of the pot. The free terminating end of each of the respective arms includes a detachable clamp for releasably engaging with the rim of the pot so that the housing and the stirrer paddle are suspended over the ingredients intended to be stirred.

Therefore, it is among the primary objects of the present invention to provide a novel adjustable mixer or stirring device that will stir sauces, puddings, custards or the like and that will fit over a variety of different sized pots or bowls and will mix hot or cold ingredients.

Another object of the present invention is to provide a novel adjustable stirring device which employs a motorized paddle unit adapted to be suspended over the ingredients intended to be stirred by a plurality of spring-loaded arms that, when extended from the housing, will clamp over the rim of the pot, bowl or pan.

Another object of the present invention is to provide a stirring device which includes means for mounting the device over the ingredients intended to be stirred by employing arms of various lengths for support and providing a downwardly depending stir paddle which is attached to the drive shaft by snap-lock connectors.

Yet another object of the present invention is to provide a stirrer having a variety of different shaped and sized paddles which may or may not include holes or passageways assisting in mixing or stirring of products and which includes snap-on connectors for accommodating different sized pots, bowls or pans.

Yet a further object of the present invention is to provide a novel motorized stirring device that is adjustably mounted onto a variety of different sized pans, pots and bowls and which includes a rechargeable battery pack and a pressed sealed bearing so as to stabilize a stirring shaft whereby the stirring paddle has a rotation path offset from the rotation of the drive shaft.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

DESCRIPTION OF THE DRAWINGS

FIG. 2 is an enlarged fragmentary perspective view illustrating the threadable connection of a support arm with the housing of the device shown in FIG. 1; and FIG. 3 is an enlarged side elevational view, partly broken away, of one extension arm supporting the housing to the rim of a pot.

DESCRIPTION OF THE PREFERRED EMBODIMENTS

Figure 1:
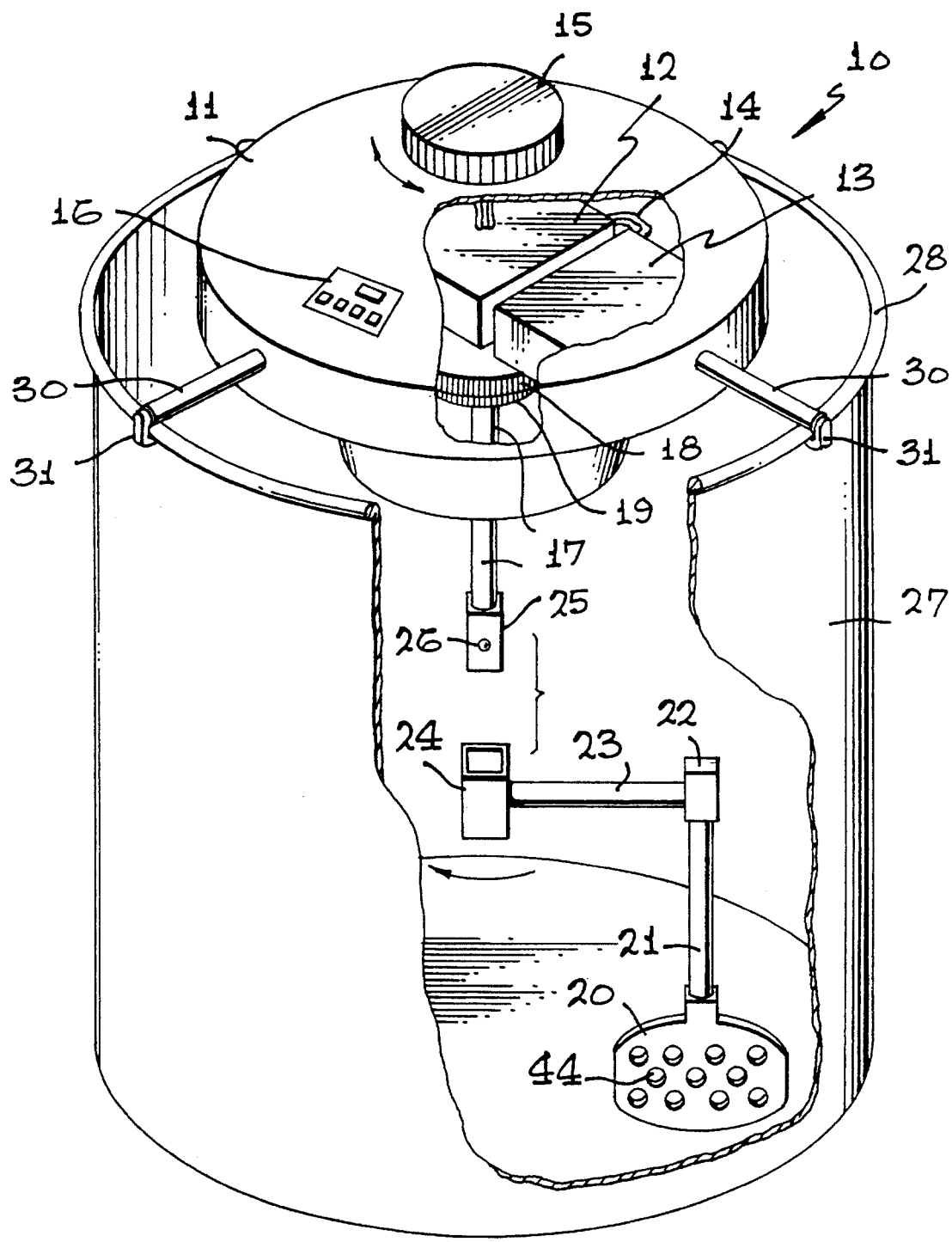
FIG. 1 is a front perspective view, partly broken away, illustrating the novel stirring device of the present invention.

Referring to FIG. 1, the novel stirring device of the present invention is illustrated in the general direction of arrow 10 and includes a housing 11 that contains a motor 12 and a power supply taking the form of a rechargeable battery 13. Wires 14 connect the battery to the motor and the motor is also connected to a dial 15 which is employed for adjusting speed of motor 12. Timing of motor operation is determined by pushbutton controls 16 operably connected to the motor 12. Motor 12 is operably connected to a rotating drive shaft 17 via gear trains 18 and 19, respectively.

A paddle 20 is employed which may be of a selected size or shape and which is carried on the end of a rod 21. Rod 21 includes a fitting 22 on its end opposite to its end connected to paddle 20 which is releasably connected with an offset link 23. The opposite end of offset link 23 includes a similar snap-lock fitting 24 that is adapted to insertably receive connector 25 having a depressable detent 26. Therefore, when the end of the drive shaft 17 carrying the snap-lock 25 is introduced into the receptacle of the connector 24, a snap-lock connection occurs which is releasable when separated by the user. A similar coupling or attachment is utilized for the connector 22. Therefore, it is seen that the path of travel for the stir paddle 20 is in a circular path about the axis of rotation of the drive shaft 17 and is offset therefrom as determined by the length of offset link 23.

The ingredients intended to be stirred are held within the container 27 which may be a pan, bowl or, as illustrated, a deep pot having an open upper end defined by a rim 28. The housing and stir device are centered over the ingredients intended to be stirred and suspended in that position by means of a plurality of outwardly extending arms such as arm 30. The arms are outwardly extendable from the periphery of the housing 11 by a spring bias mechanism so that the diameter of the pot opening is accommodated. The end of each extendable arm includes a clamp 31 which releasably engages about the rim 28 of the pan 27.

Referring now in detail to FIG. 2, it can be seen that the housing 11 includes a threaded opening 32 into which the threaded end 33 of extendable arm 30 is introduced and attached.

Referring now in detail to FIG. 3, it can be seen that each of the extendable arms includes a pair of telescoping tubes such as indicated by numerals 34 and 35 with the clamp 31 carried on the end of tube 35. The clamp includes a downwardly depending member terminating in a hook 36 which engages about the rim 28 of the pot 27. In order to effect extension, the arm 30 includes internal spring 37 which is coupled at one end to a stationary pin 38 by means of hook 40. The opposite end of the spring has an elongated finger 41 terminating in a hook 42 which engages an annular groove 43 formed on the inside of the housing 11. Therefore, the spring may rotate through the annular groove by means of hook 42 during installation or usage of the device. Therefore, it can be seen that each of the extension arms 30 may be adjusted in its length by extending tube 35 outwardly from its telescoping mounting within the bore of tube 34. The tension of spring 37 is to draw the clamp 31 inwardly towards the housing so that a holding force releasably secures the clamp 31 against the rim 28.

In view of the foregoing, it can be seen that the motorized stirring device of the present invention provides a novel means for adjustably supporting the motorized housing and the stirring mechanism on the edge of a pot and wherein a variety of different sized diameter pots can be accommodated. Speed and timing controls are provided used at the selection of the user and a variety of stir paddles can be employed of different size and shape. As illustrated, the stir paddle 20 further includes a plurality of apertures or openings 44 which also may be of different size or shape. By employing a variety of detachablae connectors and different lengths of links or rods, the stir paddle 20 can be arranged to follow a revolving path set up by the user. The use of detachable connectors between the rods and links and drive shaft 17 further increases the versatility of the device.

This invention has been described in its presently contemplated best modes, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An adjustable pot stirrer comprising:

a housing enclosing a motorized drive means having a downwardly depending rotatable stirring device;

a plurality of adjustable length support arms outwardly extendable from said housing and each arm terminating in a hook clamp;

said support arms radially disposed about said housing in fixed spaced-apart relationship;

each arm of said plurality being extendable to place its associated hook clamp at a prescribed distance from said housing;

each arm of said plurality including a pair of tubes arranged in end-to-end coaxial telescoping relationship with one end of said pair of tubes secured to said housing and the other end carrying said hook clamp; and spring biasing means enclosed by said pair of tubes having one end connected to said housing and its other end connected to said hook clamp.

2. The invention as defined in claim 1 wherein:

said stirring device includes a drive shaft having a vertical turning axis;

a stir paddle revolving along a circular path in spaced-apart relationship from said turning axis; and offset means releasably connecting said drive shaft with said stir paddle laterally locating said stir paddle on said circular path.

3. The invention as defined in claim 2 including:

time and speed controls carried on said housing in operable connection with said motorized drive means to select length of rotation time and speed of rotation of said stir paddle.

4. The invention as defined in claim 3 wherein:

said stir device includes detachable snaplock connectors to releasably join said stir paddle with said offset means and for releasably joining said offset means with said drive shaft.

5. An adjustable pot stirrer comprising:

a housing;

a motor disposed in said housing having a downwardly depending drive shaft rotatable about a vertical turning axis;

a stir paddle;

offset means detachably joining said stir paddle with said drive shaft whereby said stir paddle revolves in a circular path about said turning axis and in spaced-apart relationship therewith;

said offset means including a rod having opposite ends, an offset link having opposite ends, and detachable connectors joining one end of said link to said drive shaft and the other end of said link to one end of said rod;

said stir paddle releasably coupled to the end of said rod opposite to its end joined with said link;

said drive shaft and said rod being arranged in vertical orientation with said link extending in a horizontal orientation maintaining said stir paddle offset from said turning axis; and adjustable support means operably carried on said housing and outwardly extending therefrom to support said housing over the ingredients intended to be stirred while said stir paddle is in the ingredients.

6. An adjustable pot stirrer as defined in claim 5 wherein:

said adjustable support means includes at least two pairs of telescoping tubes with an internal spring biasing means forcibly and yieldably urging and drawing said pair of tubes together.

7. An adjustable pot stirrer as defined in claim 6 wherein:

said pair of telescoping tubes have opposite ends;

a selected end of one tube of said pair fixed to said housing and a selected end of the other tube of said pair carrying a hook clamp.

8. An adjustable pot stirrer as defined in claim 7 wherein:

said internal spring biasing means is enclosed within said pair of tubes, and a selected end of said internal spring biasing means is connected to said housing and the other end of said internal spring biasing means is connected to said hook clamp.

9. The invention as defined in claim 5 wherein:

said adjustable support means includes at least three arms cantilevered outwardly from said housing terminating in a clamp at the free end of each arm.

10. The invention as defined in claim 9 wherein:

each arm includes a first tube secured to said housing and a second tube carried by said first tube in telescoping, coaxial relationship; and said clamp carried on the end of said second tube.

11. The invention as defined in claim 10 including:

spring-bias means resiliently connecting said second tube to said housing and enclosed by said first tube.

12. The invention as defined in claim 11 wherein:

said spring-bias means includes a helical spring contraction means having hooks carried on opposite ends thereof;

an annular groove provided within said housing engageable by said hook on one of said helical spring contraction means; and a stationary pin fixed on said second tube engageable with the other hook of said helical spring contraction means.

* * * * *